Figure 1:
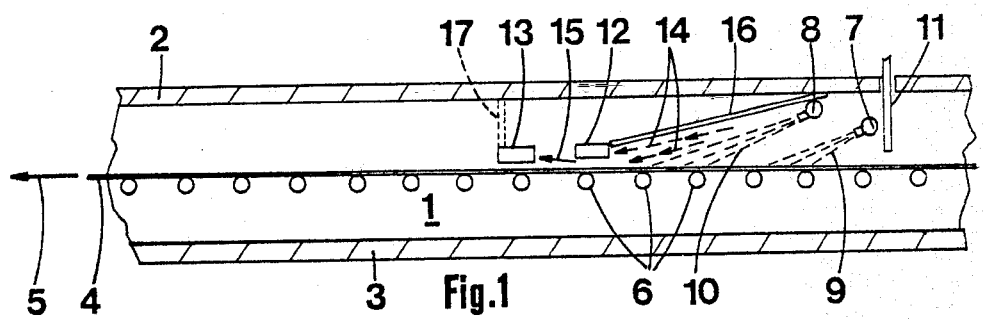

United States Patent [19]

Terneu

[11] 4,349,370
[45] Sep. 14, 1982

[54] PROCESS FOR COATING GLASS

[75] Inventor: Robert Terneu, Thiméon, Belgium

[73] Assignee: BFG Glassgroup, Paris, France

[21] Appl. No.: 228,234

[22] Filed: Jan. 26, 1981

[30] Foreign Application Priority Data

Jan. 31, 1980 [GB] United Kingdom ............... 8003358

[51] Int. Cl.³ .................. C03C 17/00; C03C 17/10; C03C 17/25
[52] U.S. Cl. .................................. 65/60.4; 65/60.5; 65/60.51; 65/60.52; 427/110; 427/160; 427/168
[58] Field of Search ............... 65/60.4, 60.5, 60.51, 65/60.52; 427/110, 160, 168

[56] References Cited

FOREIGN PATENT DOCUMENTS 1516032 6/1978 United Kingdom.
1523991 9/1978 United Kingdom.

Primary Examiner—James R. Hoffman
Attorney, Agent, or Firm—Spencer & Kaye

[57] ABSTRACT

In the formation of a metal or metal compound coating on a face of a heated glass substrate during its forward displacement along a tunnel by contacting the substrate at a coating station in the tunnel with at least one stream of droplets comprising one or more substances from which said coating is formed, and simultaneously exerting suction forces in exhaust ducting to draw environmental gases away from that station, the coating may sometimes be spoiled by side reactions or by the spurious deposition of substances from the atmosphere within the tunnel. To help reduce this spoiling, the exhaust ducting comprises at least one exhaust duct (12) whose entrance is located in said tunnel (1) forwardly or rearwardly of the coating station and which forms or is associated with a barrier wall (16) located so as to prevent gases from passing over said duct, towards and into contact with the droplet stream(s) (9, 10).

20 Claims, 4 Drawing Figures

PROCESS FOR COATING GLASS

BACKGROUND OF THE INVENTION

This invention relates to a process of forming a metal or metal compound coating on a face of a heated glass substrate during its displacement in a given direction along a tunnel by contacting the substrate at a coating station in said tunnel with at least one stream of droplets comprising a substance or substances from which said coating metal or metal compound is formed on said face, and simultaneously exerting suction forces in exhaust ducting to draw environmental gases away from that station.

Such a process can be employed for coating glass sheets and for coating a continuous freshly formed ribbon of flat glass. In the latter case the coating of the glass can take place in the usual annealing gallery or lehr. The process can be used for forming coatings, e.g. metal oxide coatings, which modify the apparent colour of the glass and/or which have some other required properties in respect of incident radiation, e.g. an infrared-reflecting property.

The suction forces which in known processes are exerted downstream from, i.e. forwardly of, the coating station promote the formation of coatings of homogenous structure with uniform coverage of the substrate.

When applying such a process the best results have been obtained when using a stationary exhaust ducting whose inlet(s) extend(s) transversely across the path of the glass substrate. Suction forces can then be maintained over the full transverse extent of the coating as it is formed.

Even in those circumstances however, defects sometimes occurred internally of the coating and/or at the glass or coating surface and of a nature which suggests they are attributable to products which have been formed in the environment or to impairment of the coating during its formation by contact with a coating precursor compound which has not reacted or has not completely reacted at the coating station.

The foregoing defects may not make the product valueless but may disqualify the product for top quality rating and this becomes more likely with increase in the quality standards demanded by customers. If the defects are at the surface of the coating, the quality of the product can be in some but not all cases be improved by an after-coating surfacing treatment, but of course such addition treatments add to the product costs.

Attempts have been made to promote coating quality by careful control of the suction forces to ensure that they are effective for their intended purpose but do not disturb the steadiness of the droplet stream(s). Improvements have also been sought by modifying the number and the arrangement of the exhaust ducts. A further measure which has been proposed is the employment of two or more exhaust ducts disposed at successive spaced positions downstream from the coating station so that gas which flows downstream past one such duct can enter the next one. Another proposal is to provide successive exhaust ducts at different levels above the path of the glass substrate. These measures, while useful, have not been found to be a sufficient solution to the problem of coating defects above referred to.

SUMMARY OF THE INVENTION

The present invention provides a process wherein the environment is acted on in a way which helps to reduce spoiling of the coating by side reactions or deposition of substances from within the atmosphere in the tunnel.

The process according to the present invention is characterised in that the exhaust ducting comprises at least one exhaust duct whose entrance is located in said tunnel forwardly or rearwardly of said coating station and which forms or is associated with a barrier wall located so as to prevent gases from passing over said duct, towards and into contact with the droplet stream(s).

During research leading up to the invention it was found that even when designing and locating exhaust ducting with the object of maintaining a smooth flow of environmental gases away from the coating station, there is a tendency for the coating to become spoiled by spurious reaction or deposits in the vicinity of the coating spray. The research further showed that such defects can be avoided or reduced by intercepting gas currents flowing back towards the coating station from positions further along the tunnel. These return currents can comprise amounts of gas which have flowed towards the entrance of an exhaust duct but which have by-passed its entrance, e.g. by flowing between the exhaust duct entrance and the coated glass substrate, and have subsequently flowed back over such duct towards the coating station. Such return currents may in certain plant alternatively or additionally comprise amounts of gases which enter the coating plant at places behind the exhaust ducting. The objectionable deposits may have been attributable to the interaction of such return currents with exhaust gas currents flowing towards the exhaust ducting from the coating station, and/or to dust particles entrained in such return currents. However the invention is not dependent on any such theory in explanation of the benefits of the barrier wall.

As known per se, the exhaust ducting may comprise one or more exhaust ducts which or each of which has an entrance in the form of a single slot-like orifice or in the form of a series of inlet orifices, such orifice or orifices extending or being distributed across the width of the tunnel.

Advantageously, at least one said barrier wall extends across an upper part of the tunnel, between exhaust ducting and the tunnel roof. Such wall may e.g. be formed by a plate of refractory material such as asbestos or metal. A said barrier wall may alternatively be formed by part of an exhaust duct itself. For example a portion of such duct leading towards the gas entry orifice(s) can extend downwardly into the tunnel via an opening in the tunnel roof so that such downwardly extending portion forms the barrier wall.

Preferably there is at least one said barrier wall which is disposed substantially vertically. This arrangement has the advantage of great simplicity and economy of material.

Although the invention can be carried out using a single exhaust duct, it is preferable to employ two or more such ducts which are disposed at spaced positions along the tunnel. For the purpose of this specification the duct which is nearer or nearest to the coating station is called the first duct.

In certain embodiments of the invention there is a plurality of exhaust ducts which are at spaced positions along the tunnel and a said barrier wall is formed by or associated with at least the last duct, i.e. the duct which is further or furthest from the coating station.

Preferably each of at least two exhaust ducts, located at spaced positions along the tunnel, forms or is associated with a said barrier wall.

Preferably there is a said barrier wall extending at a forward and downward inclination to the exhaust duct, or to the first exhaust duct if there is more than one, from a position above and in the vicinity of the source(s) of the droplet stream(s). Such a sloping barrier fulfils the additional function of assisting smooth flow of environmental gas into such exhaust duct under the suction forces therein.

The invention includes processes wherein there are exhaust ducts which are at spaced positions along the tunnel and wherein over the space between such ducts there is a bridge which prevents return current gases from descending between such ducts. Coating defects can be caused not only by deposition of spuriously formed reaction products at a region between the coating station and the exhaust ducting, but also by deposition of such reaction products at places between successive exhaust ducts. Such latter deposits are less likely to occur if there is a bridge as above specified. The bridge prevents return current gases from being drawn downwardly between the exhaust ducts and any turbulent conditions which occur at that region are kept nearer to the entrance to an exhaust duct where the gases can be more easily extracted.

In some processes according to the invention there is at least one inter-duct bridge as aforesaid and suction forces are created in a vent tube which is incorporated in or disposed adjacent such bridge, thereby to draw off gases from an upper part of the space beneath the bridge and avoid or reduce whirls or eddy currents between the exhaust ducts.

Preferably the vertical distance between the entrance of the or each exhaust duct and the substrate face being coated is between 1 and 20 cm.

For achieving the most efficient exhaust of gases it is preferable to provide a plurality of exhaust ducts which are located at spaced positions along the tunnel and with their entrances at a vertical distance above the substrate face being coated which decreases from the first duct to the last.

The droplet stream(s) is or are preferably repeatedly displaced to and fro transversely across the tunnel for covering the width of the substrate area to be coated. Alternatively the material may be sprayed in a stream or streams whose impingement zone or combined impingement zones on the substrate cover(s) the entire width to be coated, in which case there is no need for transverse displacement of the spraying device.

Preferably the droplet stream(s) is or are inclined downwardly and forwardly or downwardly and rearwardly onto the substrate and the said exhaust duct(s) is or are located for drawing gases away from the coating station in the same (forward or rearward) direction over the substrate path. Processes in which the droplet stream(s) is or are downwardly and forwardly inclined and in which the exhaust gases are drawn forwardly away from the coating station are the subject of United Kingdom Pat. Nos. 1 516 032 and 1 523 991. Preferably the included angle between the axis or axes of the droplet stream(s) and the substrate face being coated is in the range 20° to 60° and most preferably 25° to 35°. This feature facilitates the formation of coatings of good optical quality. For obtaining the best results all parts of the droplet stream(s) should be incident upon the substrate at a substantial inclination to the vertical. Accordingly, in the most preferred embodiments of the invention the or each droplet stream is a parallel stream or is one which diverges from its source at an angle of not more than 30°, e.g. an angle of about 20°.

Although it is preferable for the droplet stream(s) to be downwardly inclined towards the substrate, the invention includes processes wherein the axis or axes of the droplet stream(s) is or are vertical.

Experiments indicate that uniform coatings can be more easily formed if certain conditions are observed with respect to the distance between the substrate face being coated and the source(s) of the droplet stream(s). Preferably such distance, measured normally to the substrate face, is from 15 to 35 cm. This has been found to be the most suitable range, particularly when observing the preferred inclination and divergency ranges of the droplet stream(s) above referred to.

The invention can be employed for coating separate glass sheets or a continuous glass ribbon.

The invention includes processes as hereinbefore defined employed for coating a continuous ribbon of glass travelling from a flat glass forming plant, e.g. a float tank or a drawing machine. In certain such applications of the invention, the droplet stream(s) impinge(s) on the top face of the ribbon at a position where the temperature of the glass is within the range 650° C. to 100° C.

The process according to the invention can be applied for forming various oxide coatings by employing a liquid composition containing a metal salt. Very advantageous processes according to the invention include processes wherein the droplets are droplets of a solution of a metal salt, a particularly good example being metal chloride, from which a metal oxide coating forms on the substrate. In some such processes the said solution is a tin chloride solution, e.g. an aqueous or non-aqueous medium containing stannic chloride and a doping agent, e.g. a substrate providing ions of antimony, arsenic or fluorine. The metal salt can be employed together with a reducing agent, e.g. phenyl hydrazine, formaldehyde, alcohols and non-carbonaceous reducing agents such as hydroxylamine, and hydrogen. Other tin salts may be used in place of or in addition to stannic chloride, e.g., stannous oxalate or stannous bromide. Examples of other metal oxide coatings which can be formed in a similar manner include oxides of cadmium, magnesium and tungsten. For forming such coatings the coating composition can likewise be prepared by forming an aqueous or organic solution of a compound of the metal and a reducing agent. Solutions of nitrates can be used, e.g. iron or indium nitrate. As further examples the invention can be employed for forming coatings by pyrolysis of organometallic compounds, e.g. metal carbonyls and acetylacetonates supplied in droplet form to the substrate face to be coated. Also certain metal acetates and alkylates can be used, e.g. tin dibutyl diacetate and titanium isopropylate. It is within the scope of the invention to apply a composition containing salts of different metals so as to form a metal coating containing a mixture of compounds of different metals.

The invention includes apparatus suitable for use in forming a metal or metal compound coating on a face of a heated glass substrate, said apparatus comprising a tunnel, means for conveying a substrate in a given (hereafter called "forward") direction through said tunnel, spraying means for discharging at least one stream of droplets onto the substrate at a coating station in said tunnel, and gas exhaust means for continuously sucking environmental gases away from said coating station, characterised in that said exhaust means comprises at least one exhaust duct whose entrance is located in said tunnel forwardly or rearwardly of said coating station, and which forms or is associated with a barrier wall located so that it can prevent gases from passing over said duct, towards and into contact with said droplet stream(s).

Apparatus according to the invention can incorporate any of the apparatus features required for making use of any of the optional process features hereinbefore referred to.

BRIEF DESCRIPTION OF THE DRAWING

Certain apparatus according to the invention, selected by way of example, will now be described with reference to the accompanying diagrammatic drawings comprising FIGS. 1 to 4 which are cross-sectional elevations of parts of four different flat glass forming plants incorporating such coating apparatus.

DESCRIPTION OF THE PREFERRED EMBODIMENTS

Each of the figures shows part of a tunnel, e.g. an annealing lehr, through which a freshly formed ribbon of glass is conveyed from a flat glass forming station (not shown). In the lehr there are devices for spraying material onto the glass ribbon and exhaust ducting for drawing gases forwardly along the lehr from the coating station. The different plants are identical as to certain parts and corresponding parts are designated by the same numerals in the different figures. These common parts will be described first, with reference to FIG. 1.

The annealing lehr 1, has refractory roof and sole walls 2, 3. The glass ribbon 4 travels along the lehr in the direction of arrow 5 while supported on rollers 6.

Two spray guns 7, 8 are located within the lehr, above the path of the glass ribbon. Each of these guns is mounted on a transverse guideway and connected to driving means for displacing the spraying devices to and fro across the lehr. The mounting and the displacement mechanism of the spray guns is part of the known art and needs no detailed description. The spray guns are arranged to discharge solutions of coating precursor materials as droplet streams 9, 10 which are inclined forwardly and downwardly onto the substrate. The spray gun 7 delivers a solution of a coating precursor compound, e.g. titanium acetylacetonate, which becomes converted to a metal oxide undercoating on contact with the hot glass ribbon. The spray gun 8 discharges a solution of an overcoat precursor compound, e.g. a solution of a tin chloride, which becomes converted to a metal oxide top coating on contact with the hot substrate.

Immediately to the rear of transverse path of the spray gun 7 there is a screen 11 which extends transversely across the lehr above the path of the glass ribbon. The temperature condition of the glass can be controlled preparatory to receiving the metal oxide coatings.

Exhaust ducting is provided in the lehr forwardly of the coating station. This ducting comprises a first exhuast duct 12 and a second exhaust duct 13. These ducts extend transversely across the lehr and have slot-like entry orifices facing towards the coating station and extending across the width of the ribbon path. The ducts are connected to means (not shown) for maintaining suction forces in the ducts to cause environmental gases to flow forwardly away from the coating station and into the ducts. Such exhaust currents are represented by the lines 14, 15. The exhaust current 15 is formed by gas which flows beneath exhaust duct 12.

When coating ribbons of glass by coating apparatus as above described coating defects have sometimes occurred which have been caused by side reaction or deposition of reaction products from within the environment above the glass ribbon. The occurrence of such defects can sometimes be reduced by appropriate control of the suction forces in the exhaust ducting but notwithstanding such control measures, some such defects still occur from time to time. The measures taken in accordance with the present invention, in the four different plants illustrated in the drawings, in order to achieve further improvements in the quality of the coatings will now be described.

In the plant shown in FIG. 1, a barrier wall 16, formed by a plate of metal or other material, is provided which extends at a forward and downward inclination to exhaust duct 12 from a position above and in the vicinity of the spray gun 8. This barrier wall has two effects. Firstly it has been found that there is less tendency for the coating on the glass to be spoiled by deposition of a substance or substances from the environment above the glass ribbon at the coating station or by contact with reactive substances entrained into contact with the coating forwardly of the coating zone. Within the lehr there are normally return gas currents which flow along the uppermost region of the lehr towards its entrance. The improvement in the quality of the coating is probably largely attributable to the fact that the barrier wall 16 prevents any such return gas currents from flowing over exhaust duct 12 and into contact with the droplet streams 9, 10 and/or to the fact that the said barrier inevitably prevents any such return gas currents from flowing into contact with the exhaust gas currents such as 14 which flow towards the exhaust ducting from the coating station.

The second effect of the barrier wall 16 is to promote smooth flow of environmental gas into the exhaust duct 12 as suggested by the lines 14.

A still further improvement in the coating quality, in terms of freedom from spurious deposits, can be achieved by installing a further barrier wall 17 as shown in broken line between the second exhaust duct and the roof wall of the lehr. This improvement is thought to occur because in the absence of that barrier wall it is possible for material entrained in return currents of gas flowing over exhaust duct 13, or material forming as a result of an interaction of such return currents with the exhaust currents 15, to become deposited on the glass ribbon at a region between the two exhaust ducts 12, 13.

The presence of dust in the return currents is confirmed by the appearance of an accumulation of dust on the faces of the barrier walls exposed to such return currents. The accumulation is very slow. It is advantageous for a barrier wall to be disposed vertically, as is barrier wall 17, in order to avoid the risk of a substantial amount of dust, accumulated over a period of time, from falling onto the ribbon.

It is within the scope of the invention to dispense with the barrier wall 16 and to rely solely on the barrier wall 17 for producing an improvement in the coating quality. Because the barrier wall 17 is capable of preventing return gas currents from flowing over exhaust duct 13 from a region further downstream along the lehr, it prevents such return currents from reaching the coating station. If barrier wall 16 is not present it is possible for forward gas currents which by-pass duct 12 and fail to enter duct 13 to flow back over duct 12 and into contact with the droplet stream, but barrier wall 17 reduces any tendency for that to happen and the use of the barrier wall 17 alone is effective for promoting an improvement in the coating quality.

Figure 2:
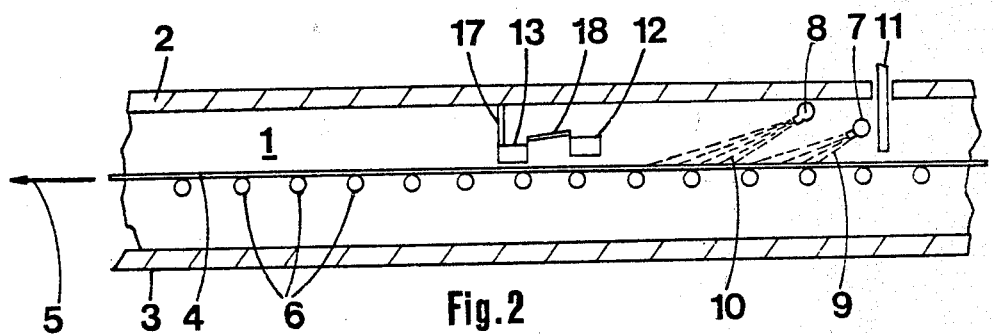

In the embodiment of the invention shown in FIG. 2 use is made of a barrier wall 17 in association with the second exhaust duct 13 and of a bridge 18 between the two exhaust ducts. The addition of that bridge is beneficial because it prevents forward gas currents by-passing duct 12 from flowing upwardly out of the range of the suction forces in duct 13 and being drawn back towards the coating station. Any tendency for turbulence to occur in the region between the two exhaust ducts is reduced and forward gas currents are more likely to be extracted via the duct 13.

Figure 3:
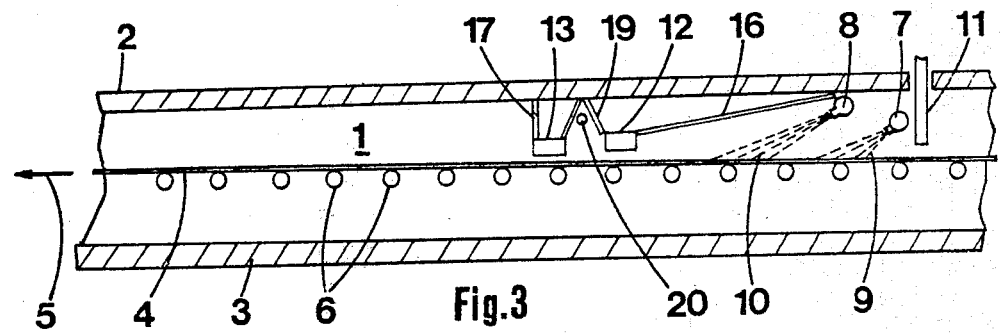

In the apparatus shown in FIG. 3 an arched bridge 19 is employed between the two exhaust ducts and at the centre of the bridge there is a vent tube 20 whch also forms part of the exhaust system. Suction forces are maintained in this tube as well as in the exhaust ducts 12, 13. Such suction forces help to avoid or reduce turbulence or eddy currents in the atmosphere between the said ducts. In this particular plant, the bridge and associated vent tube are used in conjunction with barrier walls 16 and 17 associated with the first and second ducts. The combined measures have been found to be beneficial for achieving coatings of a very high quality. However it is within the scope of the invention to modify the plant shown in FIG. 3 by omitting one of the walls 16 and 17.

The plant illustrated in FIGS. 1 to 3 incorporate two successive exhaust ducts near to the ribbon path. An advantageous feature of the coating apparatus used in those plants is the location of those exhaust ducts so that the entrance to the second duct is nearer to the ribbon path than is the entrance to the first duct. This arrangement takes account of the reduction in the volume flow rate of gas in the forward current caused by extraction of part of this current via the first duct. It is generally suitable for the ducts to be between 1 and 20 cm above the glass ribbon path, depending on the overall plant design and performance. Good results have been obtained for example when locating the first and second ducts with their entrances 10 cm and 5 cm respectively above the glass ribbon path.

Figure 4:
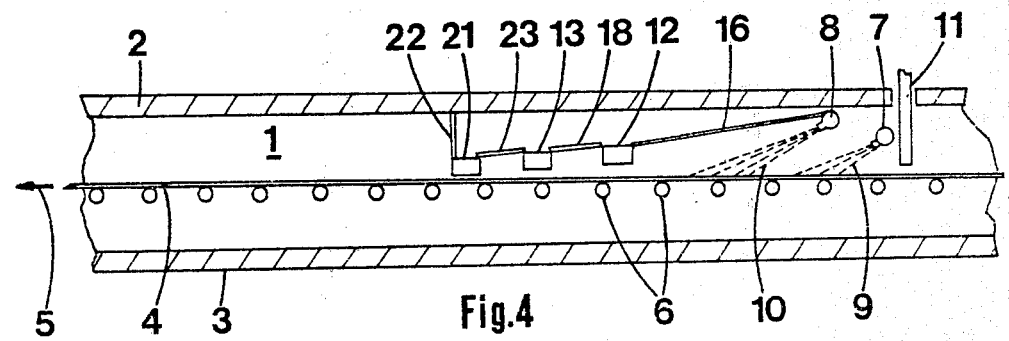

In the plant shown in FIG. 4 there are three successive exhaust ducts along the lehr, namely exhaust ducts 12 and 13 as in the plant shown in FIGS. 1 to 3, and a third duct 21. The provision of the third duct is particularly useful in plants in which there are high volume forward currents along the lehr and/or in which additional exhaust facility is required because of a relatively high spray velocity or volume or because of the nature of the sprayed material. In a particular plant giving good results, the ducts 12, 13 and 21 were respectively located at 10 cm, 5 cm and 2.5 cm above the ribbon path. A barrier wall 16 is used in association with the first exhaust duct and a vertical barrier wall 22 is associated with the third exhaust duct. A bridge 23 is provided between the second and third ducts, as well as the bridge 18 between the first and the second ducts. The bridge 23 serves the same function in relation to exhaust gases by-passing duct 13 as the bridge 18 serves in relation to exhaust gas by-passing duct 12. The coating apparatus shown in FIG. 4 is capable of forming coatings of exceptionally high quality.

In the processes above described with reference to the drawings the coating sprays are directed downwardly and forwardly onto the substrate. Processes according to the invention can also be carried out in the illustrated ways but with the modification that the direction of travel of the glass ribbon through the lehr is opposite to the direction of arrow 5. In those circumstances the coating sprays are inclined downwardly and rearwardly within the meaning of this specification. Such alternative procedures are also capable of producing coatings of high quality but generally the results obtained using sprays which are downwardly and forwardly inclined are superior in terms of the coating uniformity, particularly when forming relatively thick coatings.

The illustrated processes are processes wherein the coatings are formed on a continuous ribbon of glass. Coating apparatus as illustrated can also be used for coating separate sheets of glass during their conveyance along a tunnel such as the lehr 1. When coating separate sheets, it is sometimes useful to provide bottom screens which extend(s) transversely across the lower part of the tunnel, beneath the path of conveyance of the sheets, in order to prevent any return gas convection currents flowing along that lower part of the tunnel from rising between successive sheets and disturbing the environment in the coating station or stations.

The following are examples of the invention:

EXAMPLE 1

A ribbon of float glass having a width of about 2.5 meters was coated as it travelled from a float tank, at a speed of 4.5 meters per minute, using a coating apparatus as represented in FIG. 3 in which however spray gun 7 was not used.

The spray gun 8, which was of conventional type, was fed at a rate of 50 liters per hour with a solution obtained by dissolving cobalt acetylacetonate $Co(C_5H_7O_2)_2 2H_2O$ in dimethyl formamide in an amount of 140 g of the acetylacetonate per liter of the solvent. The spray gun was mounted 25 cm above the glass ribbon and was pointed at an inclination of 30° to the plane of the glass ribbon. The gun was reciprocated at 10 cycles per minute. The sprayed solution impinged on the glass ribbon at a position along its path where the glass had a temperature of about 580° C.

The exhaust ducts 12 and 13 were located 20 cm and 5 cm respectively above the glass ribbon and the exhaust system was regulated so as to maintain an underpressure of the order of 50 mm of water in each of the ducts. Suction force of a lower magnitude was maintained in the vent tube 20 to draw off gases from a region above the entrance to the exhaust duct 13.

The rate of discharge of the coating solution was adjusted so that a coating of cobalt oxide ($Co_3O_4$) having a thickness of about 920 Å formed on the glass. The coating was found not only to be of homogeneous structure and of good optical quality, but also to be relatively free from local internal inclusions and defects at the coating surface such as occasionally occurred when operating the same process without the barrier walls 16, 17 and which appeared as haze when the coated glass was viewed by transmitted light.

EXAMPLE 2

Coating apparatus as described with reference to FIG. 1 was employed for coating a ribbon of glass 3 meters in width in course of its production by a Libbey-Owens type drawing process, the speed of the glass ribbon being about 1 meter per minute. The coating apparatus was installed at a position such that the temperature of the glass at the zone of impingement of the droplet steam was about 600° C.

Spray gun 7 was not used. Spray gun 8 was of a conventional type and was operated at a pressure of 4 kg/cm$^2$. The gun was reciprocated transversely of the ribbon path at 9 cycles per minute and at a height of 30 cm above the glass ribbon. The gun was directed so that the axis of the spray was at 30° to the glass ribbon plane.

The spray gun was fed with an aqueous solution of hydrated tin chloride ($SnCl_2 2H_2O$) and $NH_4HF_2$ (doping agent) containing 375 g of the tin chloride and 55 g of $NH_4HF_2$ liter of water.

The exhaust ducts 12 and 13 were located at 20 cm and 10 cm respectively above the glass ribbon and the exhaust system was adjusted to maintain a depression of about 100 mm of water in each of such ducts.

The coating solution was fed to the spray gun at a rate of 20 liters per hour in an amount of 10 Nm$^3$/hr of carrier gas. A coating of tin oxide doped by fluorine ions and having a thickness of 7500 Å was formed on the glass ribbon.

The barrier wall 16 was found to be helpful in reducing the occurrence of coating defects causing internal haze. When in a comparative test the barrier wall 17 was used, such improvement was enhanced and it appeared that the wall 17 could reduce the risk of local defects occurring at the glass surface.

In a further comparative test the barrier wall 17 was used alone, i.e. without wall 16. From examination of the coating formed on the glass and comparison with the other results it was apparent that the presence of the wall 17 reduces the incidence of defects at the surface of the coating and contributes to some extent in the avoidance of defects within the coating.

EXAMPLE 3

A ribbon of drawn glass was coated in apparatus as shown in FIG. 2. Both of spray guns 7 and 8 were used. Spray gun 7 was fed with a solution of titanium di-isopropoxydiacetylacetonate in isopropyl alcohol, the acetylacetonate having been formed by reacting titanium tetraisopropylate and acetylacetone in a molar ratio of 1:2. The acetylacetonate is fed at a rate such as to cause formation of an undercoating of $TiO_2$ 300 Å in thickness on the glass ribbon.

The spray gun 8 was fed with an aqueous solution of tin chloride and doping agent as in Example 2, to form a tin oxide coating doped by fluorine ions and having a thickness of 7500 Å, on top of the titanium oxide undercoating.

The exhaust ducts 12 and 13 were located at 10 cm and 5 cm respectively above the glass ribbon and the exhaust system was adjusted to maintain a depression of the order of 100 mm of water in each of the ducts.

From examination of the coated glass in comparison with a product resulting from the use of a process performed without using the barrier wall 17 or the bridge 18 but otherwise identical it was evident that the use of the barrier wall and bridge was beneficial in reducing the occurrence of local defects internally of the coating and at the coating surface. The presence of the sub-coating, formed by the operation of spray gun 7, obviates haze at the glass/coating interface.

In a modification of the example, using the barrier wall 17 and the bridge 18, the second exhaust duct 13 was disposed at 10 cm above the glass ribbon. The results were not quite so good, although still better than in the process performed without the barrier wall and bridge.

EXAMPLE 4

A ribbon of drawn glass was coated using apparatus as shown in FIG. 4 comprising three exhaust ducts 12, 13 and 21 located at 10 cm, 5 cm and 2.5 cm respectively above the glass ribbon.

The spray gun 7 was fed with a solution of tin dibutyldiacetate in dimethylformamide in a concentration of 5% by volume. The gun was operated at a pressure of 3 kg/cm$^2$ and was fed with the solution at a rate such as to form on the glass ribbon an undercoating of $SnO_2$ having a thickness of the order of 60 Å.

The spray gun 8 was fed with an aqueous solution of tin chloride and doping agent as in Example 2 for forming a doped tin oxide coating 7500 Å in thickness on top of the undercoating.

The product of this process was examined and was found to be of excellent quality. There were virtually no defects within the coating or at the glass/coating interface. Moreover the surface of the coating was substantially free from spurious deposits requiring removal by a subsequent surfacing treatment.

I claim:

1. In a process of forming a metal or metal compound coating on a face of a heated glass substrate during its displacement in a given direction, constituting the forward direction of displacement, along a tunnel by contacting the substrate at a coating station in said tunnel with at least one stream of droplets composed of at least one substance from which said coating metal or metal compound is formed on said face, and simultaneously exerting suction forces in exhaust ducting to draw environmental gases away from that station, the improvement wherein said step of exerting suction forces is carried out by means of exhaust ducting composed of at least one exhaust duct whose entrance is located in said tunnel and is spaced parallel to the given direction from said coating station, and a barrier wall located so as to prevent gases from passing over said duct, towards and into contact with the droplet stream.

2. A process according to claim 1, characterised in that at least one said barrier wall extends across an upper part of the tunnel, between a said exhaust duct and the tunnel roof.

3. A process according to claim 1 or 2, characterised in that there is at least one said barrier wall which is disposed substantially vertically.

4. A process according to claim 1 or 2, characterised in that there is a plurality of said exhaust ducts which are at spaced positions along the tunnel and a said barrier wall is associated with at least that duct which is further or furthest from the coating station.

5. A process according to claim 1 or 2, characterised in that there are at least two said exhaust ducts, located at spaced positions along the tunnel, each associated with a said barrier wall.

6. A process according to claim 1 or 2, characterised in that there is a said barrier wall inclined downwardly and in the given direction to said exhaust duct from a position above and in the vicinity of the source of the droplet stream.

7. A process according to claim 1 or 2, characterised in that there are a plurality of said exhaust ducts which are at spaced locations along the tunnel and over the space between such ducts there is a bridge which prevents return current gases from descending between said ducts.

8. A process according to claim 7, comprising creating suction forces in a vent tube which is associated with at least one said bridge thereby to draw off gases from an upper part of the space beneath that bridge.

9. A process according to claim 1 or 2, characterised in that the vertical distance between the entrance of said at least one exhaust duct and the substrate face being coated is between 1 and 20 cm.

10. A process according to claim 1 or 2, characterised in that there is a plurality of said exhaust ducts which are located at spaced positions along the tunnel and with their entrances at a vertical distance above the substrate face being coated which decreases from the first duct to the last in the given direction.

11. A process according to claim 1 or 2, characterised in that said droplet stream is repeatedly displaced to and fro transversely across the tunnel.

12. A process according to claim 1 or 2, characterised in that the distance, measured normally to the substrate face being coated, between that face and the source of the droplet stream is from 15 to 35 cm.

13. A process according to claim 1 or 2, characterised in that the droplets are droplets of a solution of a metal salt, e.g. a metal chloride, from which a metal oxide coating forms on said substrate face.

14. A process according to claim 13, characterised in that said solution is a tin chloride solution.

15. A process according to claim 1, characterised in that said droplet stream is directed at a downward inclination along the tunnel onto the substrate and said exhaust duct is located for drawing gases away from the coating station in the same direction along the tunnel as the direction of the downward inclination of the droplet stream.

16. A process according to claim 15, characterised in that said droplet stream is inclined so that the included angle between the axis of the droplet stream and the substrate face being coated is in the range of 20° to 60°.

17. A process according to claim 15 or 16, characterised in that the stream of droplets is a parallel stream or diverges from its source at an angle of not more than 30°.

18. A process according to claim 1, characterised in that the substrate is a continuous ribbon of glass travelling from a flat glass forming plant.

19. A process according to claim 18, characterised in that said forming plant is a float tank.

20. A process according to claim 18 or 19, characterised in that the droplet stream impinge on the top face of the ribbon at a location where the temperature of the glass is within the range of 650° to 100°.

* * * * *